United States Patent
Jeong et al.

(10) Patent No.: US 11,333,918 B2
(45) Date of Patent: May 17, 2022

(54) DISPLAY APPARATUS

(71) Applicant: SAMSUNG ELECTRONICS CO., LTD., Suwon-si (KR)

(72) Inventors: Seung Jun Jeong, Suwon-si (KR); Sei Young Kang, Suwon-si (KR); Min Woo Kang, Suwon-si (KR); Dong Jun Lee, Suwon-si (KR); Jae Jeong Lee, Suwon-si (KR); Joo Won Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 128 days.

(21) Appl. No.: 16/430,595

(22) Filed: Jun. 4, 2019

(65) Prior Publication Data
US 2020/0033665 A1   Jan. 30, 2020

(30) Foreign Application Priority Data
Jul. 27, 2018 (KR) .......... 10-2018-0087822

(51) Int. Cl.
*G02F 1/1335* (2006.01)
*G02B 27/09* (2006.01)

(52) U.S. Cl.
CPC ..... *G02F 1/133502* (2013.01); *G02B 27/095* (2013.01); *G02B 27/0927* (2013.01)

(58) Field of Classification Search
CPC .. G02B 27/09; G02B 27/0927; G02B 27/095; G02B 1/14; G02B 3/005; G02B 3/0056; G02B 5/02; G02B 5/021; G02B 5/0273; G02B 5/0236; G02B 5/0231; G02F 1/1335; G02F 1/133502; G02F 1/133504; G02F 1/133526; G02F 1/133606; G02F 2001/133562; G02F 2001/133507
USPC .............. 359/601, 605, 606, 609, 613, 599; 349/64, 62, 95, 112
See application file for complete search history.

(56) References Cited

U.S. PATENT DOCUMENTS

| | | | |
|---|---|---|---|
| 2009/0097275 A1 | 4/2009 | Sato | |
| 2009/0167987 A1 | 7/2009 | Kim et al. | |
| 2009/0256997 A1 | 10/2009 | Misono et al. | |
| 2015/0043221 A1 | 2/2015 | Lee et al. | |

(Continued)

FOREIGN PATENT DOCUMENTS

| | | |
|---|---|---|
| EP | 3088950 A1 | 11/2016 |
| WO | 2012/005135 A1 | 1/2012 |

OTHER PUBLICATIONS

Communication dated Oct. 30, 2019, issued by the European Patent Office in counterpart European Application No. 19188471.7.

(Continued)

*Primary Examiner* — Jie Lei
(74) *Attorney, Agent, or Firm* — Sughrue Mion, PLLC

(57) ABSTRACT

Disclosed herein is a display apparatus. The display apparatus includes a backlight unit configured to emit light, a display panel positioned in front of the backlight unit, and an optical film positioned in front of the display panel. The optical film includes a base layer positioned adjacent to the display panel, a first refractive layer positioned in front of the base layer and having a pattern including a first inclined portion totally reflecting some of light waves emitted from the backlight unit, and a second refractive layer positioned in front of the first refractive layer and having a lower refractive index than the first refractive layer.

19 Claims, 11 Drawing Sheets

(56) References Cited

U.S. PATENT DOCUMENTS

2016/0116664 A1   4/2016   Wheatley et al.
2016/0252665 A1   9/2016   Lee et al.

OTHER PUBLICATIONS

International Search Report (PCT/ISA/210) dated Sep. 24, 2019 issued by the International Searching Authority in International Application No. PCT/KR2019/006176.
Written Opinion (PCT/ISA/237) dated Sep. 24, 2019 issued by the International Searching Authority in International Application No. PCT/KR2019/006176.

DISPLAY APPARATUS

CROSS-REFERENCE TO RELATED APPLICATION(S)

This application is based on and claims priority under 35 U.S.C. § 119 to Korean Patent Application No. 10-2018-0087822, filed on Jul. 27, 2018, in the Korean Intellectual Property Office, the disclosure of which is incorporated by reference herein in its entirety.

BACKGROUND

1. Field

The disclosure relates to a display apparatus, and more particularly to a display apparatus including an optical film.

2. Description of Related Art

A display apparatus is a type of output device that visually displays data information such as characters, graphics, and images.

The display apparatus may include an emissive type display panel such as an organic light emitting diode (OLED) panel, or a non-emissive type display panel such as a liquid crystal display (LCD) panel.

A display apparatus having a liquid crystal display may include an optical film to improve a viewing angle. The optical film may include a plurality of refractive layers having different refractive indices. The optical film may improve the viewing angle of the display apparatus by utilizing the refraction phenomenon of light based on the refractive index difference among the plurality of refractive layers.

However, there is a limit in improving the viewing angle of a display apparatus using only an optical film that utilizes a refraction phenomenon of light caused by a refractive index difference among the plurality of refractive layers. When a material capable of maximizing the refractive index is used, the manufacturing cost of the optical film is increased.

SUMMARY

Therefore, it is an aspect of the present disclosure to provide a display apparatus having an improved viewing angle.

It is another aspect of the present disclosure to provide a display apparatus capable of reducing reflection of external light.

It is another aspect of the present disclosure to provide a display apparatus having an improved contrast ratio.

Additional aspects of the present disclosure will be set forth in part in the description which follows and, in part, will be obvious from the description, or may be learned by practice of the present disclosure.

In accordance with an aspect of the disclosure, a display apparatus includes a backlight unit configured to emit a first plurality of light waves, wherein the first plurality of light waves includes a second plurality of light waves; a display panel positioned in front of the backlight unit; and an optical film positioned in front of the display panel, wherein the optical film includes a base layer positioned adjacent to the display panel, a first refractive layer positioned in front of the base layer, wherein the first refractive layer includes a pattern, wherein the pattern includes a first inclined portion, wherein the first inclined portion is configured to totally reflect the second plurality of light waves, and wherein the first refractive layer is associated with a first refractive index, and a second refractive layer positioned in front of the first refractive layer, wherein the second refractive layer is associated with a second refractive index, and wherein the second refractive index is less than the first refractive index.

The first inclined portion may be oriented at a first angle with respect to a direction in which the first refractive layer extends, wherein the pattern includes a second inclined portion inclined at a second angle with respect to the direction in which the first refractive layer extends, and wherein the second angle is smaller than the first angle.

The second inclined portion may be configured to refract the second plurality of light waves.

The optical film may be configured such that, among light waves incident in a front-rear direction, the second plurality of light waves is emitted at a larger angle with respect to a front-rear direction than a third plurality of light waves is emitted, wherein the third plurality of light waves is emitted without having undergone total reflection by the first inclined portion, and wherein the first plurality of light waves includes the third plurality of light waves.

The optical film may be configured such that, among a fourth plurality of light waves obliquely incident with respect to a front-rear direction, light waves emitted after being refracted by the first inclined portion are emitted at a smaller angle with respect to the front-rear direction than light waves refracted by the second inclined portion, wherein the fourth plurality of light waves is included in the first plurality of light waves.

The second refractive layer may include a supplement portion positioned between the second inclined portions.

The pattern of the first refractive layer may include a parallel portion extending in a direction in which the first refractive layer extends.

The pattern of the first refractive layer may be formed in an embossed pattern.

The second refractive layer may include a filling portion filling between the patterns of the first refractive layer.

The display apparatus may include an adhesive layer positioned between the display panel and the optical film.

In the display apparatus the second plurality of light waves may include a fifth plurality of light waves incident in a front-rear direction.

The display panel may include a polarizing sheet, and the base layer may be positioned in front of the polarizing sheet.

In accordance with another aspect of the disclosure, the display apparatus includes a display panel; and an optical film positioned in front of the display panel, wherein the optical film includes a base layer positioned adjacent to the display panel, a first refractive layer positioned in front of the base layer, wherein the first refractive layer includes a pattern, wherein the pattern includes a first inclined portion, wherein the first inclined portion is configured to totally reflect first light waves passing through the base layer, wherein the first refractive layer includes a second inclined portion configured to refract the first light waves totally reflected by the first inclined portion, and wherein the first refractive layer is associated with a first refractive index, and a second refractive layer positioned in front of the first refractive layer, wherein the second refractive layer is associated with a second refractive index, and wherein the second refractive index is less than the first refractive index.

The optical film may be configured such that, among light waves incident in the front-rear direction, the first light waves are emitted at a larger angle with respect to a front-rear direction than second light waves emitted without having undergone total reflection by the first inclined portion.

The optical film may be configured such that, among third light waves obliquely incident with respect to a front-rear direction, light waves emitted after being refracted by the first inclined portion are emitted at a smaller angle with respect to the front-rear direction than light waves refracted by the second inclined portion.

The pattern of the first refractive layer may be formed in an embossed pattern.

The second refractive layer may include a filling portion filling between the patterns of the first refractive layer.

The display apparatus may include an adhesive layer positioned between the display panel and the optical film.

The first inclined portion may be oriented at a first angle with respect to a direction in which the first refractive layer extends, wherein the second inclined portion is oriented at a second angle with respect to the direction in which the first refractive layer extends, and wherein the first angle is greater than the second angle.

In accordance with yet another aspect of the disclosure, the display apparatus includes a display panel comprising a polarizing sheet; and an optical film positioned in front of the display panel, wherein the optical film comprises: a base layer positioned on the polarizing sheet, a first refractive layer positioned on the polarizing sheet, wherein the first refractive layer includes an embossed pattern, wherein the embossed pattern is configured to totally reflect some light waves incident in a front-rear direction among light waves passing through the base layer, and wherein the first refractive layer is associated with a first refractive index, and a second refractive layer positioned in front of the first refractive layer wherein the second refractive layer is associated with a second refractive index, and wherein the second refractive index is less than the first refractive index.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
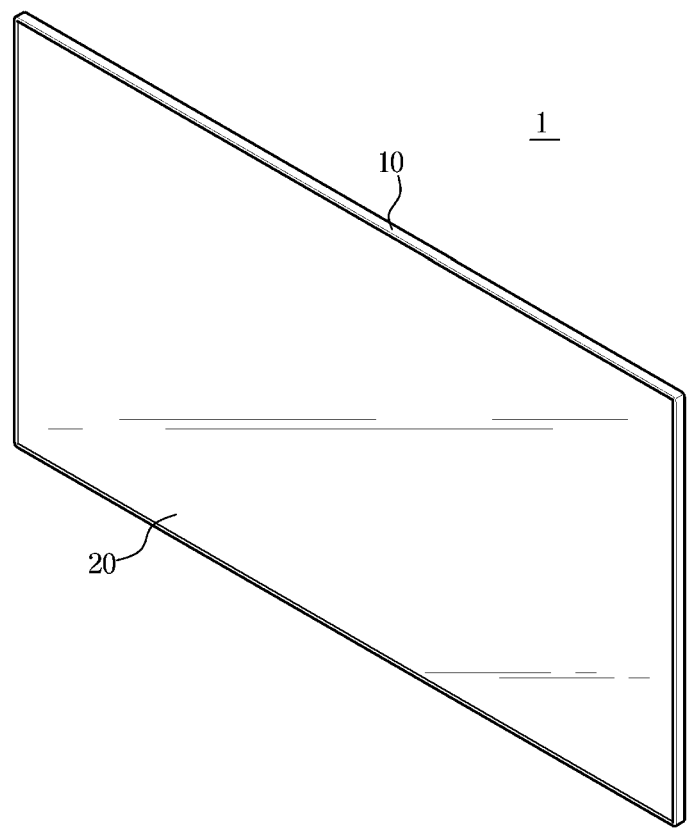
FIG. 1 is a view of a display apparatus according to an embodiment of the disclosure.

In the following description, like reference numerals refer to like elements throughout the specification. Well-known functions or constructions are not described in detail since they would obscure the one or more exemplary embodiments with unnecessary detail.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but the disclosure is not limited by these terms. These terms are only used to distinguish one element from another element.

As used herein, the singular forms "a," and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Figure 2:
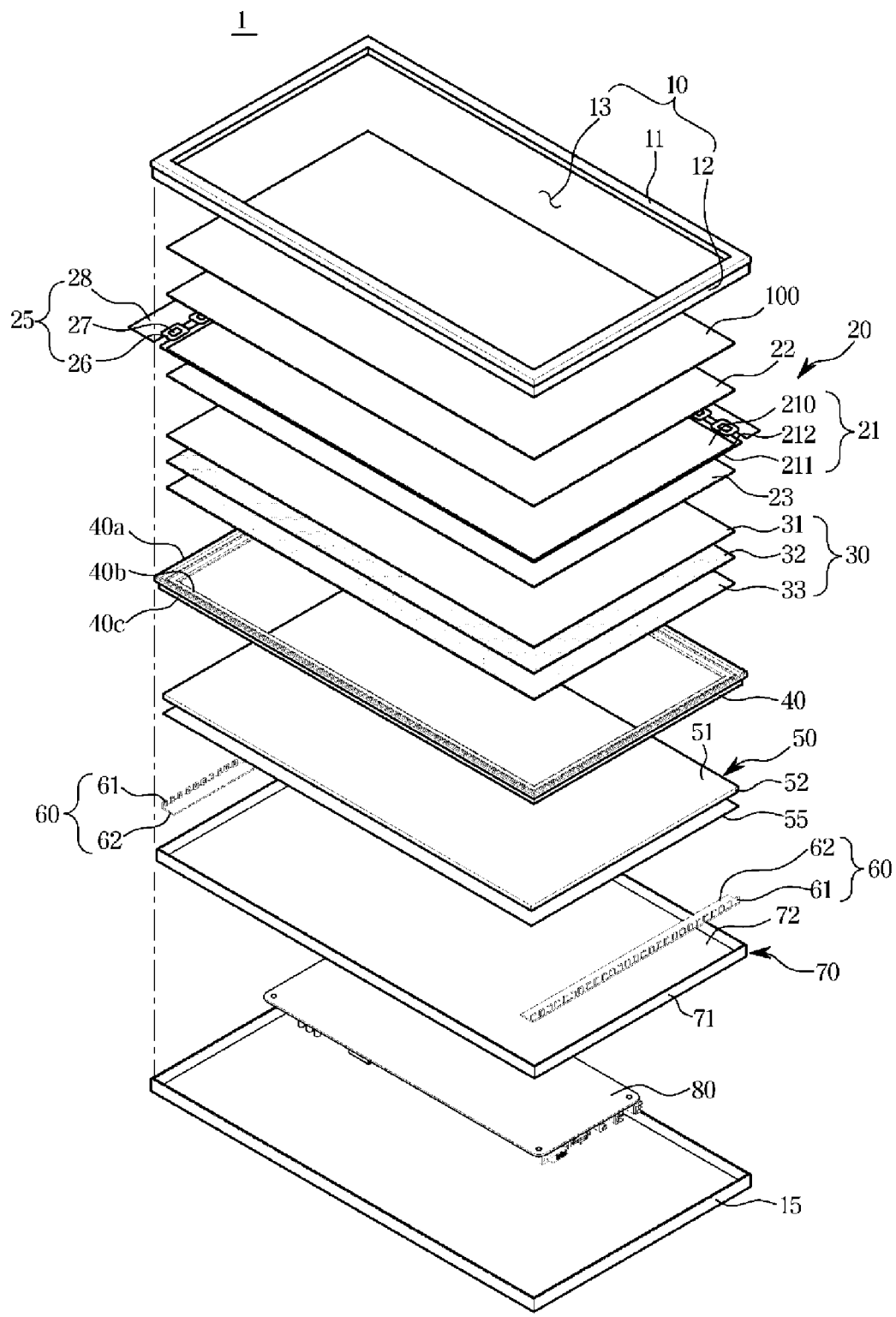
FIG. 2 is an exploded view of the display apparatus shown in FIG. 1.

Reference will now be made in detail to embodiments of the present disclosure, examples of which are illustrated in the accompanying drawings FIG. 1 is a view of a display apparatus according to an embodiment of the disclosure. FIG. 2 is an exploded view of the display apparatus shown in FIG. 1.

Referring to FIGS. 1 and 2, according to an embodiment of the disclosure, a display apparatus 1 includes a top chassis 10, a display panel 20, a backlight unit 60, and a bottom chassis 70. The top chassis 10 is positioned in front of the display panel 20. The display panel 20 may be positioned in front of the backlight unit 60. The backlight unit 60 is positioned behind the display panel 20 to be apart from the display panel 20. The bottom chassis 70 may be positioned behind the display panel 20 and the backlight unit 60.

A middle mold 40 may be further provided between the display panel 20 and the backlight unit 60. The middle mold 40 may allow the display panel 20 to be supported apart from the backlight unit 60. A printed circuit board 80 configured to control a drive of the display apparatus 1 may be positioned behind the bottom chassis 70. A rear cover 15 forming a rear outer appearance of the display apparatus 1 may be provided behind the printed circuit board 80.

A plurality of optical sheets 30 may be provided behind the display panel 20. A light guide plate 50 may be positioned behind the plurality of optical sheets 30. A reflective sheet 55 may be positioned behind the light guide plate 50.

The plurality of optical sheets 30 include a protective film 31, a prism film 32, and a diffusion film 33. The protective film 31 is positioned in front of the prism film 32 to protect the prism film 32 sensitive to scratches such as dust.

A triangular prism may be positioned in front of the prism film 32. Through the prism film 32, light diffused by the diffusion film 33 may be focused on a direction perpendicular to a rear surface of the display panel 20. Two prism films 32 may be used. The light passing through the prism film 32 may travel perpendicularly to the display panel 20 so as to allow the display panel 20 to have a uniform brightness. Light passing through the light guide plate 50 may be diffused by the diffusion film 33 and supplied to the display panel 20.

The light guide plate 50 may be configured to allow light emitted from a light emitting diode 61 to be uniformly supplied to the diffusion film 33. The light guide plate 50 may include an exit surface 51 and an incident surface 52. The exit surface 51 may be located behind the diffusion film 33 and face one surface of the diffusion film 33. The incident surface 52 may be provided on the side surface and on which light emitted from the light emitting diode 61 is incident.

The reflective sheet 55 may be positioned behind the light guide plate 50. Light emitted through a lower surface of the light guide plate 50 may be guided to the light guide plate 50 again by the reflective sheet 55.

The backlight unit 60 includes a plurality of light emitting diodes 61 and a printed circuit board 62. The backlight unit 60 may be configured to emit light. The light emitting diode 61 may supply light to the light guide plate 50. The plurality of light emitting diodes 61 may be mounted on the printed circuit board 62.

The plurality of light emitting diodes 61 may be mounted to protrude from one surface of the printed circuit board 62. The plurality of light emitting diodes 61 may be arranged on a surface of the printed circuit board 62 at a predetermined distance.

The printed circuit board 62 may be positioned behind the reflective sheet 55. The printed circuit board 62 may be fixed to the bottom chassis 70 via a fastening member such as a screw or an attachment means such as a double-sided tape. As for the printed circuit board 62, a back surface of a surface on which the plurality of light emitting diodes 61 are mounted, may be fixed to a bottom surface 72 of the bottom chassis 70.

The display panel 20 may include a first substrate 211 having a thin film transistor (TFT) and a pixel electrode, and a second substrate 210 positioned on one side of the first substrate 211 and provided with a color filter and a driving source. A liquid crystal layer 212 may be provided between the first substrate 211 and the second substrate 210. Polarizing sheets 22 and 23 may be attached to the rear of the first substrate 211 and/or the front of the second substrate 210. A module in which the first substrate 211, the second substrate 210, and the liquid crystal layer 212 are combined may be referred to as a liquid crystal display module 21.

A driver 25 applying a driving signal may be provided on one side of the first substrate 211. The driver 25 may include a flexible printed circuit board 26, a driving chip 27, and a circuit board 28. The driving chip 27 may be mounted on one side of the flexible printed circuit board 26. The circuit board 28 may be connected to the other side of the flexible printed circuit board 26.

A black matrix (not shown) may be formed on the second substrate 210. A cable to which the driver 25 and the printed circuit board 80 are connected may pass through the rear space of the black matrix.

The display panel 20 may form a screen by adjusting the arrangement of the liquid crystal layer 212. As a non-light emitting element, the display panel 20 may receive light from the backlight unit 60 and display an image.

An optical film 100 improving a viewing angle and/or a contrast ratio may be positioned in front of the display panel 20. Details of the optical film 100 will be described later.

The top chassis 10 may include a bezel 11 and a top lateral side 12. The bezel 11 may cover the front edge of the display panel 20. The top lateral side 12 may be bent downward from an end portion of the bezel 11. At least a part of the top lateral side 12 may be in contact with the bottom chassis 70. For example, at least one part of the top lateral side 12 may cover the outer side of a bottom lateral side 71.

The top chassis 10 may be provided with an opening 13 through which the display panel 20 is exposed. An effective display area, in which a screen is actually displayed on the display panel 20, may be exposed to the front side through the opening 13.

The bottom chassis 70 may include the bottom lateral side 71 and the bottom surface 72. The bottom lateral side 71 may extend upwardly along the circumference of the bottom surface 72. The backlight unit 60 may be seated on the bottom surface 72. A heat radiation sheet (not shown) may be positioned behind the bottom surface 72 of the bottom chassis 70.

The middle mold 40 may include a first support portion 40a, a second support portion 40b, and an extension portion 40c. The first support portion 40a and the second support portion 40b may extend to the inside of the middle mold 40. The second support portion 40b may extend inward from the first support portion 40a and extend downward from the first support portion 40a to be stepped. The extension portion 40c extends to the lower side of the middle mold 40. A part of the display panel 20 may be supported by the first support portion 40a. A part of the optical sheet 30 may be supported by the second support portion 40b. An outer surface of the extension portion 40c may be in contact with the inner surface of the bottom chassis 70.

The light emitting diode 61 may simultaneously emit light and heat. The printed circuit board 62 may serve not only to supply a driving signal to the light emitting diode 61 but also to transmit the heat generated by the light emitting diode 61 to the outside. That is, the heat generated in the light emitting diode 61 may be transmitted to the bottom chassis 70 through the printed circuit board 62. The printed circuit board 62 may be formed of a metal having a high thermal conductivity to increase heat transfer efficiency. For example, the printed circuit board 62 may be formed of a metal material including aluminum or copper.

A printed circuit board 80 may be mounted on the rear side of the bottom chassis 70. The rear cover 15 may be located behind the printed circuit board 80. The printed circuit board 80 may include a printed circuit board 81 and a plurality of electronic components mounted on the printed circuit board 81. The electronic components may be mounted on the upper surface and/or the lower surface of the printed circuit board 81. The plurality of electronic components may be mounted on or fixed to the printed circuit board 82 by a clamp.

Figure 3:
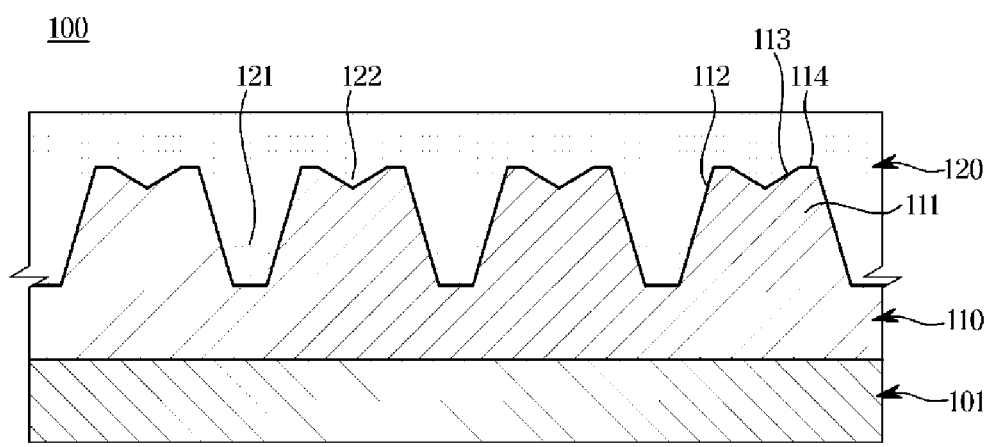
FIG. 3 is a cross-sectional view schematically illustrating an optical film shown in FIG. 2.
Figure 4:
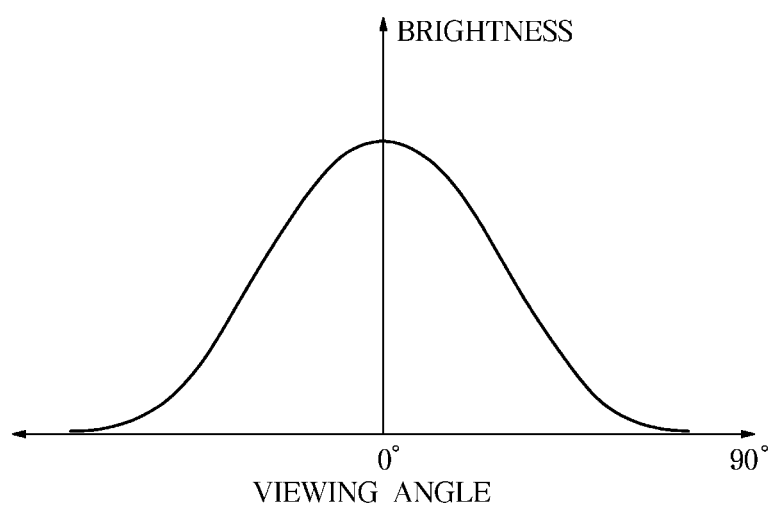
FIG. 4 is a graph illustrating the distribution of light emitted from a backlight unit shown in FIG. 2.
Figure 5:
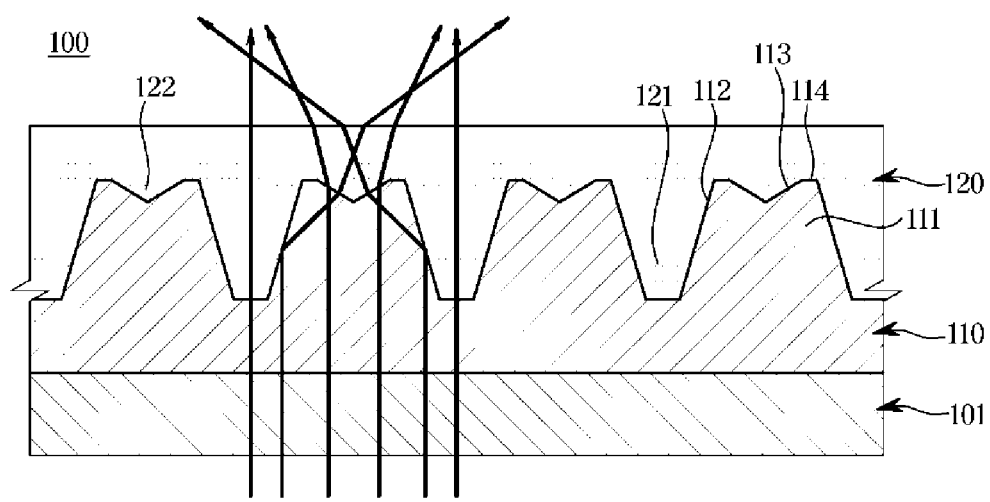
FIG. 5 is a view schematically illustrating a state in which light, which is incident approximately perpendicular to the optical film shown in FIG. 3, is refracted.
Figure 6:
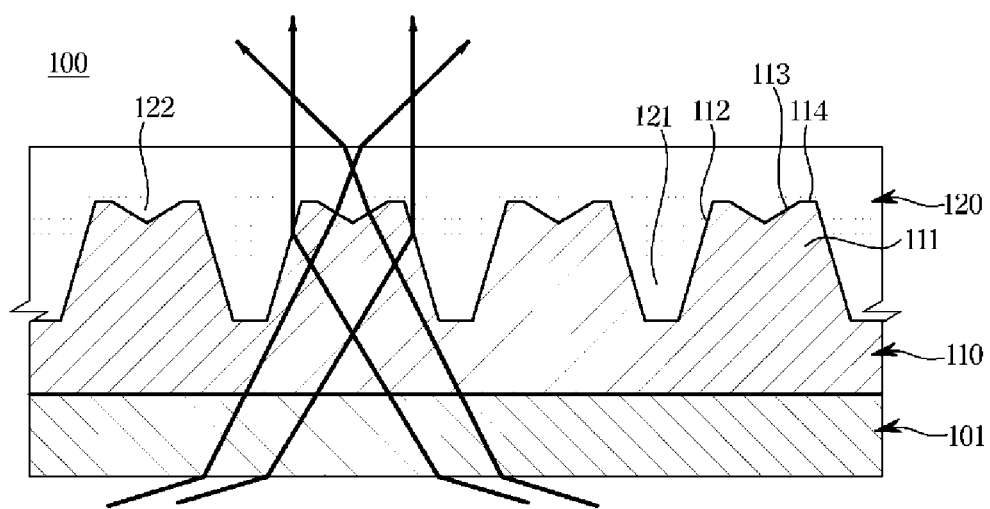
FIG. 6 is a view schematically illustrating a state in which light, which is obliquely incident on the optical film shown in FIG. 3, is refracted.

FIG. 3 is a cross-sectional view schematically illustrating the optical film 100 shown in FIG. 2. FIG. 4 is a graph illustrating the distribution of light emitted from a backlight unit shown in FIG. 2. FIG. 5 is a view schematically illustrating a state in which light, which is incident approximately perpendicular to the optical film shown in FIG. 3, is refracted. FIG. 6 is a view schematically illustrating a state in which light, which is obliquely incident on the optical film shown in FIG. 3, is refracted.

Referring to FIG. 3, the optical film 100 may include a base layer 101, a first refractive layer 110, and a second refractive layer 120.

The base layer 101 may be positioned adjacent to the display panel 20. The base layer 101 may be positioned on one side closer to the display panel 20. The base layer 101 may be attached to the display panel 20. The base layer 101 may be positioned in front of the polarizing sheet 22 of the display panel 20. The base layer 101 may be positioned on the polarizing sheet 22. The base layer 101 may be attached to the polarizing sheet 22 of the display panel 20. The optical film 100 may be attached to the display panel 20 through an adhesive layer 91 (see FIG. 8). The optical film 100 may be attached to the polarizing sheet 22 through the adhesive layer 91.

The base layer 101 may extend along a plane perpendicular to the front-rear direction. Light passing through the display panel 20 may pass through the base layer 101.

The first refractive layer 110 may be positioned in front of the base layer 101. The first refractive layer 110 may extend along a plane perpendicular to the front-rear direction. A pattern 111 may be formed on the base layer 110. A plurality of patterns 111 may be continuously formed in the first refractive layer 110. The pattern 111 of the first refractive layer 110 may be formed in an embossed pattern. In some embodiments, the pattern 111 is repeated at a fixed interval as shown in FIG. 3.

The pattern 111 of the first refractive layer 110 may include a first inclined portion 112. The first inclined portion 112 may be configured to totally reflect some of the light waves emitted from the backlight unit 60. The first inclined portion 112 may be configured to totally reflect some of light waves passing through the base layer 101. The first inclined portion 112 may be configured to totally reflect light waves incident in the front and rear direction among the light waves emitted from the backlight unit 60. The first inclined portion 112 may be provided in plural. In some embodiments, the first inclined portion 112 is part of the pattern 111, the pattern 111 is repeated across the optical film which creates a repetition of the first inclined portion at fixed intervals as shown in FIG. 3.

The first inclined portion 112 may be formed to be inclined with respect to a direction in which the first refractive layer 110 extends. The first inclined portion 112 may be formed to totally reflect that light, which is incident on the first refractive layer 110 in the front-rear direction, which has an incident angle greater than a critical angle. The first inclined portion 112 may form both sides of the pattern 111 with respect to the front-rear direction.

The pattern 111 of the first refractive layer 110 may include a second inclined portion 113. The second inclined portion 113 may be formed to be inclined with respect to a direction in which the first refractive layer 110 extends. The second inclined portion 113 may be formed such that an inclination angle with respect to the direction in which the first refractive layer 110 extends is smaller than an inclination angle of the first inclined portion 112. The second inclined portion 113 may be provided repeatedly as shown in FIG. 3.

The second inclined portion 113 may be configured to refract light incident in the front-rear direction. The second inclined portion 113 may be configured to refract light incident obliquely with respect to the front-rear direction. For example, light arriving through the base layer at an oblique angle as shown in FIG. 6 may not be reflected by the first inclined portion 112 but may be incident on the second inclined portion 113 and be refracted thereby. Also, the second inclined portion 113 may be configured to refract light totally reflected by the first inclined portion 112.

The pattern 111 of the first refractive layer 110 may include a parallel portion 114 extending in the same direction as the direction in which the first refractive layer 110 extends. The parallel portion 114 may extend in a direction perpendicular to the front-rear direction. The parallel portion 114 may be provided between the first inclined portion 112 and the second inclined portion 113.

Particularly, referring to FIG. 4, as for the light emitted from the backlight unit 60, the proportion of light emitted in the front-rear direction may be high and the light emitted from the backlight unit 60 may include components of light emitted in a diagonal, or oblique, direction with respect to the front-rear direction. The light emitted in the front-rear direction in the backlight unit 60 and the light emitted in the oblique direction with respect to the front-rear direction may be incident on the optical film 100 after passing through the display panel 20.

Referring to FIG. 5, some of the light waves incident on the first refractive layer 110 in the front-rear direction may be incident on the first inclined portion 112. The light waves incident on the first inclined portion 112 may be totally reflected by the first inclined portion 112. The light waves totally reflected by the first inclined portion 112 may be incident on the second inclined portion 113. The light waves incident on the second inclined portion 113 may be refracted by the second inclined portion 113. The light waves refracted by the second inclined portion 113 may be emitted to the outside through the second refractive layer 120. Because the outside is an air layer and has a lower refractive index than the second refractive layer 120, the light waves may be refracted upon being emitted to the outside from the second refractive layer 120. The light waves emitted to the outside after total reflection by the first inclined portion 112 may have a relatively large emission angle in the front-rear direction.

Some other of the light waves incident on the first refractive layer 110 in the front-rear direction may be incident on the second inclined portion 113. The light waves incident on the second inclined portion 113 may be refracted by the second inclined portion 113. The light waves refracted by the second inclined portion 113 may be emitted to the outside through the second refractive layer 120. Because the outside is an air layer and has a lower refractive index than the second refractive layer 120, the light waves may be refracted upon being emitted to the outside from the second refractive layer 120. Light waves emitted only through the refraction process in the second inclined portion 112 may have a moderate or medium emission angle in the front-rear direction.

Still some other of the light waves incident on the first refractive layer 110 in the front-rear directions may be incident on the parallel portion 114. Among the light waves incident on the first refractive layer 110, light waves, which are incident on the parallel portion 114 without passing through the first inclined portion 112 and/or the second inclined portion 113, may be emitted in the front-rear direction without being refracted by the parallel portion 114. For example, light waves which are incident on the parallel portion 114 in a direction perpendicular to the parallel portion 114 will not be refracted. Among the light waves incident on the first refractive layer 110, light waves, which are incident on the parallel portion 114 after passing through the first inclined portion 112 and/or the second inclined portion 113, may be refracted at the parallel portion 114.

Among the light waves incident on the first refractive layer 110 in the front-rear directions, light waves incident between the patterns 111 may be emitted in the front-rear direction without being refracted at the first refractive layer 110.

Referring to FIG. 6, some of light waves incident obliquely with respect to the front-rear direction may be incident on the first inclined portion 112. The light waves incident on the first inclined portion 112 may be refracted by the first inclined portion 112. The light waves refracted by the first inclined portion 112 may be emitted to the outside through the second refractive layer 120. Because the outside is an air layer and has a lower refractive index than the second refractive layer 120, the light waves may be refracted upon being emitted to the outside from the second refractive layer 120. The light waves emitted after being refracted by the first inclined portion 112 may have a relatively small emission angle in the front-rear direction.

Some other of the light waves incident obliquely with respect to the front-rear direction may be incident on the second inclined portion 113. The light waves incident on the second inclined portion 113 may be refracted by the second inclined portion 113. The light waves refracted by the second inclined portion 113 may be emitted to the outside through the second refractive layer 120. Because the outside is an air layer and has a lower refractive index than the second refractive layer 120, the light waves may be refracted upon being emitted to the outside from the second refractive layer 120. The light waves emitted after being refracted by the second inclined portion 113 may have a relatively medium emission angle in the front-rear direction.

The second refractive layer 120 may be positioned in front of the first refractive layer 110. The second refractive layer 120 may have a lower refractive index than the refractive index of the first refractive layer 110. Because the second refractive layer 120 has a refractive index different from that of the first refractive layer 110, light waves passing sequentially through the first refractive layer 110 and the second refractive layer 120 may be totally reflected or refracted. The second refractive layer 120 may have a higher refractive index than the outer air layer.

The second refractive layer 120 may include a filling portion 121 filling among the plurality of patterns 111. The filling portion 121 may be positioned in a groove between the patterns 111. The filling portion 121 may be formed to correspond to the size and shape of the grooves between the patterns 111. The filling portion 121 may be in contact with the first inclined portion 112.

The second refractive layer 120 may include a supplement portion 122 positioned between the second inclined portions 113. The supplement portion 122 may be provided to be in contact with the second inclined portion 113 formed between the parallel portions 114. The supplement portion 122 may be positioned in the groove between the second inclined portions 113. The supplement portion 122 may be formed to correspond to the size and shape of the grooves between the second inclined portions 113.

Because the display apparatus 1 according to an embodiment of the disclosure includes the optical film 100 having the above-described configuration, the display apparatus 1 may mix light waves emitted from the backlight unit 60 at various angles and emit the mixed light waves and thus it is possible to improve the viewing angle. That is, among the light waves emitted from the backlight unit 60, some light waves are totally reflected by the first inclined portion 112, refracted and emitted through the second refractive layer 120, and some other light waves are reflected by the second inclined portion 113 and emitted through the second refractive layer 120, and still other light waves are emitted by passing through the parallel portion 114 or between the patterns 111 without being refracted or total reflection. Therefore, the display apparatus 1 may emit the light waves at various angles.

In addition, because external light is incident on the first refractive layer 110 after passing through the second refractive layer 120 having a relatively low refractive index, it is possible to prevent retro reflection caused by the total reflection, and thus it is possible to reduce the glare caused by the external light.

Figure 7:
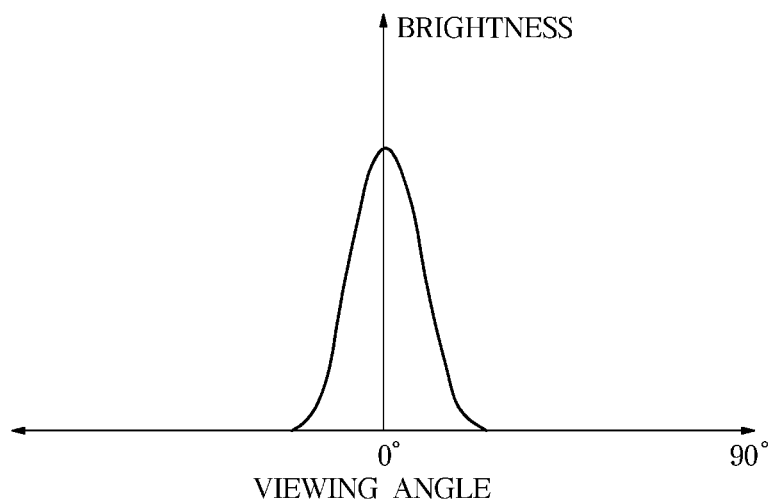
FIG. 7 is a graph illustrating the distribution of light emitted from a backlight unit according to another embodiment of the disclosure.

FIG. 7 is a graph illustrating the distribution of light emitted from a backlight unit according to another embodiment of the disclosure.

Hereinafter a description the same as those described in FIGS. 3 to 6 will be omitted.

Referring to FIG. 7, as for light emitted from a backlight unit 60, a ratio of light emitted in the front-rear direction may be very high. The backlight unit 60 may be configured to minimize an amount of light emitted in the oblique direction with respect to the front-back direction and to maximize an amount of light in the front-rear direction. The backlight unit 60 may include a condensing film (not shown) for facilitating condensation.

When the display apparatus 1 includes the condensed backlight unit 60, most of the light waves emitted from the backlight unit 60 is totally reflected and/or refracted and emitted to the outside, as illustrated in FIG. 5.

Figure 8:
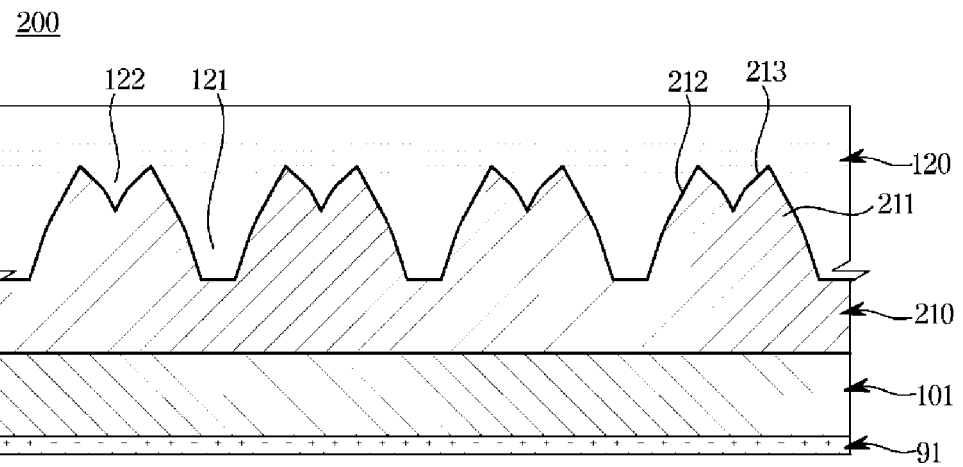
FIG. 8 is a cross-sectional view schematically illustrating an optical film according to another embodiment of the disclosure.

FIG. 8 is a cross-sectional view schematically illustrating an optical film according to another embodiment of the disclosure.

Hereinafter a description the same as those described in FIGS. 3 to 6 will be omitted.

Referring to FIG. 8, an optical film 200 may include a base layer 101, a first refractive layer 210, and a second refractive layer 120. The base layer 101 and the second refractive layer 120 are the same as those described with reference to FIGS. 3 to 6, and thus a detailed description thereof will be omitted.

A parallel portion 114 may be omitted in the first refractive layer 210 illustrated in FIG. 8 unlike the first refractive layer 110 illustrated in FIG. 3. The first refractive layer 210 may include a pattern 211 formed in an embossed pattern. The pattern 211 may include a first inclined portion 212 and a second inclined portion 213.

The first inclined portion 212 may totally reflect some of the light waves incident on the first refractive layer 210 in the front-rear direction. The light waves totally reflected by the first inclined portion 212 may be refracted by the second inclined portion 213 and have a large emission angle with respect to the front-rear direction and then emitted to the outside.

The second inclined portion 213 may refract some other of the light waves incident on the first refractive layer 210 in the front-rear direction. The light waves refracted by the second inclined portion 213 have a medium emission angle with respect to the front-rear direction and then emitted to the outside.

Among light waves incident obliquely with respect to the front-rear direction, some light waves incident on the first inclined portion 212 may be refracted by the first inclined portion 212. The light waves refracted by the first inclined portion 212 have a small emission angle with respect to the front-rear direction and then emitted to the outside.

Among the light waves incident obliquely with respect to the front-rear direction, some other light waves incident on the second inclined portion 213 may be refracted by the second inclined portion 213. The light waves refracted by the second inclined portion 213 have a medium emission angle with respect to the front-rear direction and then emitted to the outside.

Figure 9:
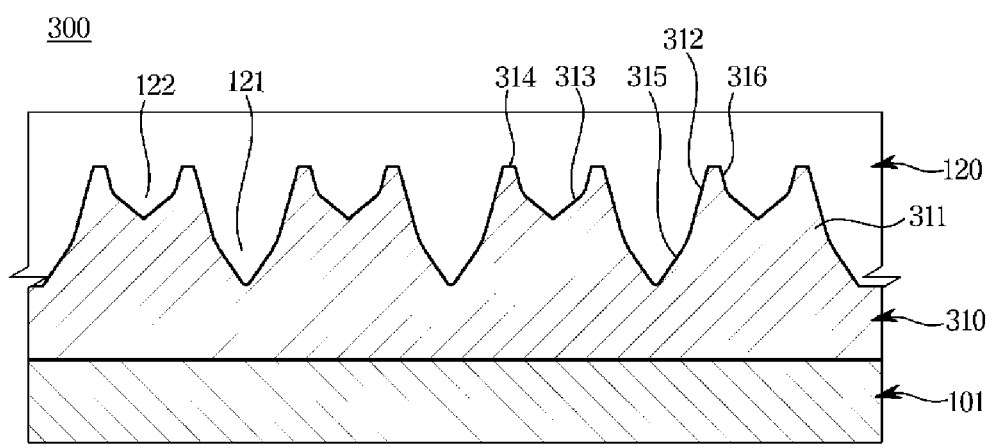
FIG. 9 is a cross-sectional view schematically illustrating an optical film according to yet another embodiment of the disclosure.

FIG. 9 is a cross-sectional view schematically illustrating an optical film according to yet another embodiment of the disclosure Hereinafter a description the same as those described in FIGS. 3 to 6 will be omitted.

Referring to FIG. 9, an optical film 300 may include a base layer 101, a first refractive layer 310, and a second refractive layer 120. The base layer 101 and the second refractive layer 120 are the same as those described with reference to FIGS. 3 to 6, and thus a detailed description thereof will be omitted.

The first refractive layer 310 illustrated in FIG. 9 may further include a third inclined portion 315 and a fourth inclined portion 316, unlike the first refractive layer 110 illustrated in FIG. 3. The first refractive layer 310 may include a pattern 311 formed in an embossed pattern. The pattern 311 may include a first inclined portion 312 and a second inclined portion 313, and a third inclined portion 315 and a fourth inclined portion 316.

The first inclined portion 312 and the fourth inclined portion 316 may be inclined to have a large angle in a direction, in which the first refractive layer 310 extends, so as to totally reflect some of light waves incident in the front-rear direction. The second inclined portion 313 and the third inclined portion 315 may be inclined to have a smaller angle than the first inclined portion 312 and the fourth inclined portion 316, so as to refract light incident in the front-rear direction.

The first inclined portion 312 and the fourth inclined portion 316 may totally reflect some of light waves incident on the first refractive layer 310 in the front-rear direction. The light waves totally reflected by the first inclined portion 312 may be refracted by the second inclined portion 313 and/or the fourth inclined portion 316, and have a large emission angle with respect to the front-rear direction and emitted to the outside. Alternatively, the light waves totally reflected by the first inclined portion 312 may be totally reflected again by the fourth inclined portion 316 and then refracted at the parallel portion 314 and/or the second refractive layer, and emitted at a large angle.

The second inclined portion 313 and the third inclined portion 315 may refract some other of the light waves incident on the first refractive layer 310 in the front-rear direction. The light waves refracted by the second inclined portion 313 or the third inclined portion 315 may have a medium emission angle with respect to the front-rear direction and emitted to the outside.

Among the light waves incident obliquely with respect to the front-rear direction, some light waves, which are incident on the first inclined portion 312 or the fourth inclined portion 316, may be refracted by the first inclined portion 312 or the fourth inclined portion 316. The light waves refracted by the first inclined portion 312 or the fourth inclined portion 316 may have a small emission angle with respect to the front-rear directions and emitted to the outside.

Among the light waves incident obliquely with respect to the front-rear direction, some other light waves, which are incident on the second inclined portion 313 or the third inclined portion 315 may be refracted by the second inclined portion 313 or the third inclined portion 315. The light waves refracted by the second inclined portion 313 or the third inclined portion 315 have a medium emission angle with respect to the front-rear direction and emitted to the outside.

Figure 10:
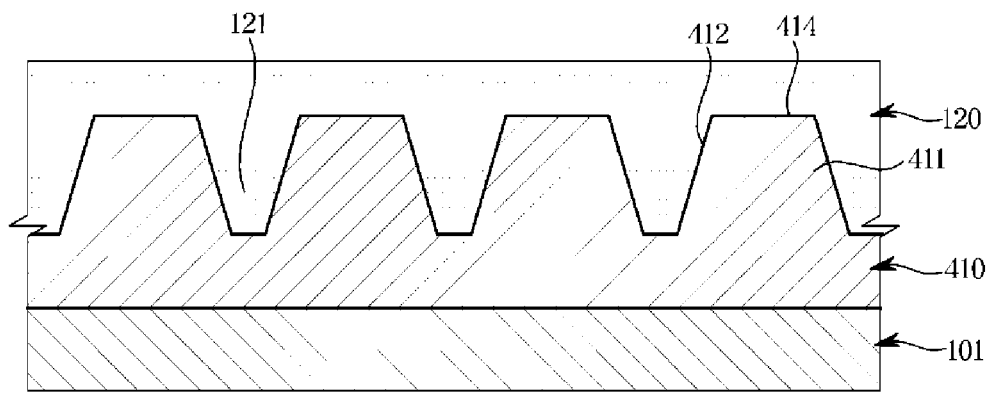
FIG. 10 is a cross-sectional view schematically illustrating an optical film according to yet another embodiment of the disclosure.

FIG. 10 is a cross-sectional view schematically illustrating an optical film according to yet another embodiment of the disclosure.

Hereinafter a description the same as those described in FIGS. 3 to 6 will be omitted.

Referring to FIG. 10, an optical film 400 may include a base layer 101, a first refractive layer 410, and a second refractive layer 120. The base layer 101 and the second refractive layer 120 are the same as those described with reference to FIGS. 3 to 6, and thus a detailed description thereof will be omitted.

The second inclined portion 113 may be omitted in the first refractive layer 410 illustrated in FIG. 10, unlike the first refractive layer 110 illustrated in FIG. 3. The first refractive layer 410 may include a pattern 411 formed in an embossed pattern. The pattern 411 may include a first inclined portion 412 and a parallel portion 414. A backlight unit 60 may use the backlight unit 60 having the emission distribution illustrated in FIG. 4.

The first inclined portion 412 may totally reflect some of light waves incident on the first refractive layer 410 in the front-rear direction. The light waves totally reflected by the first inclined portion 412 may be refracted by the parallel portion 414 and have a large emission angle with respect to the front-rear directions, and emitted to the outside.

Some other of the light waves incident on the first refractive layer 410 in the front-rear directions may be incident on the parallel portion 414 or between the patterns 411, and pass through the parallel portion 414 or between the patterns 411 without the refraction.

Among the light waves incident obliquely with respect to the front-rear direction, some light waves incident on the first inclined portion 412 may be refracted by the first inclined portion 412. The light waves refracted by the first inclined portion 412 may have a small emission angle with respect to the front-rear direction and emitted to the outside.

Among the light waves incident obliquely with respect to the front-rear direction, still some other light waves, which are incident on the parallel portion 414, may be refracted at the parallel portion 414. The light waves refracted by the parallel portion 414 may have a medium emission angle with respect to the front-rear direction and emitted to the outside.

Figure 11:
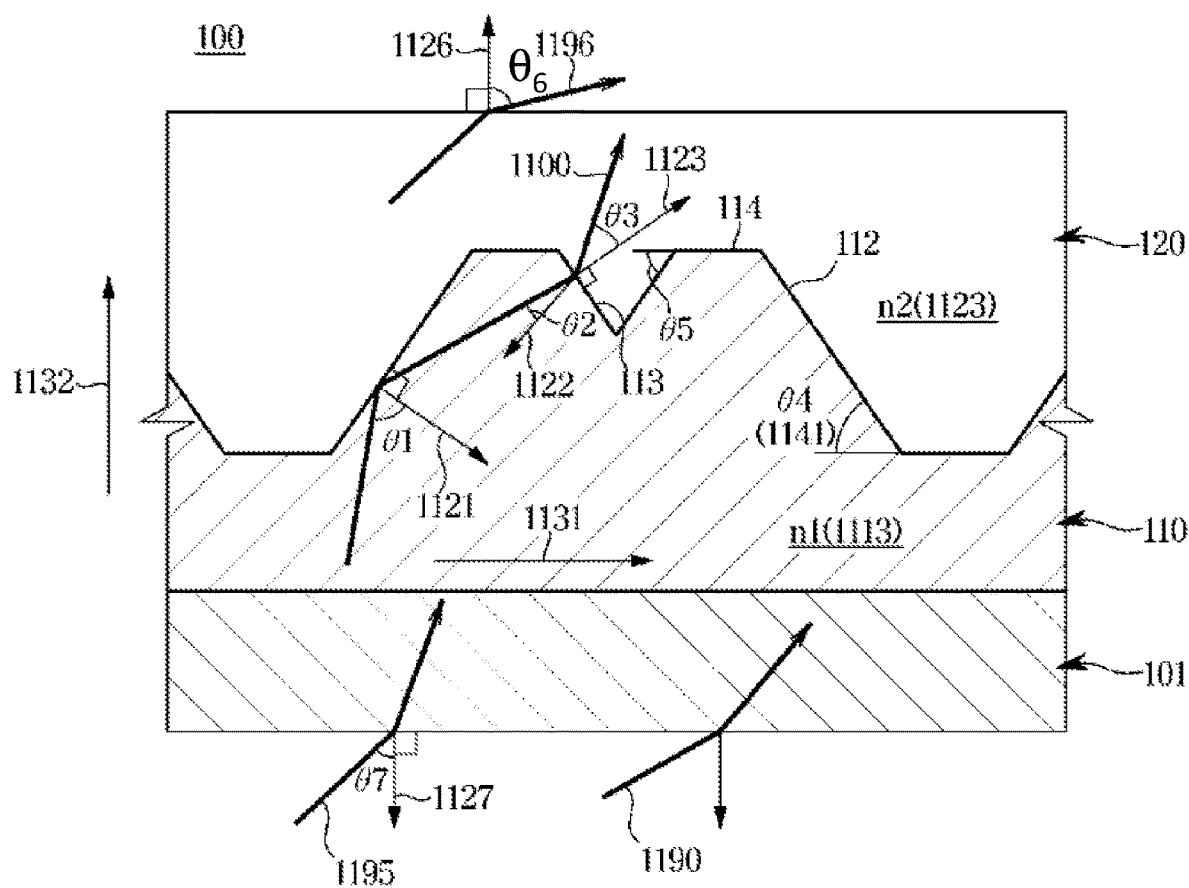
FIG. 11 indicates directions and angles of light waves passing through an exemplary optical film.

FIG. 11 provides additional illustration of light waves passing through an optical film in accordance with embodiments of this disclosure. FIG. 11 illustrates the optical film of FIGS. 3, 5, 6 and 8-10 with additional labelling of angles. FIG. 11 illustrates the base layer 101, the first refractive layer 110 (with refractive index $n_1$ indicated by reference numeral 1113) the second refractive layer 120 (with refractive index $n_2$ indicated by reference numeral 1123) and the outside. In some embodiments, $n_2 < n_1$. The direction in which the first refractive layer 110 extends is indicated with an arrow labelled 1131. A front-rear direction is indicated with an arrow labelled 1132. A normal direction to the first inclined portion 112 is indicated with a normal arrow labelled 1121. A normal direction to the second inclined portion 113 is indicated with a normal arrow labelled 1132 on first refractive layer 110 side and with a normal arrow labelled 1123 on the second refractive layer 120 side.

Light waves 1195, 1190, 1100 and 1196 are illustrated in FIG. 11. Light waves 1195 and 1190 impinge on the base layer 101. Light wave 1100 is first reflected and then refracted by the first refractive layer 110. Light wave 1196 is emitted to the outside. The light waves, in some embodiments originate at the backlight 60 illustrated in FIG. 2. In FIG. 11, the light wave 1100 is incident on the first inclined portion 112 at an angle $\theta_1$ with respect to the normal 1121. In the example of FIG. 11, the light wave 1100 is totally reflected and then is incident at an angle $\theta_2$ with respect to the normal 1132 on the second inclined portion 113. The light wave 1100 passes through to the second refractive layer 120 at an angle $\theta_3$ with respect to the normal 1123.

In FIG. 11, the front-rear direction is identified with the reference numeral 1132 and the direction in which the first refractive layer extends is identified with the reference numeral 1131. In some embodiments, the incident light wave 1100 is incident in the direction 1132.

Thus, in some embodiments, light waves 1100 which are totally reflected by the first inclined portioned 112 are refracted by the second inclined portion 113.

In comparison, the incident light wave 1195 is incident at the rear surface of the base layer 101 at an angle $\theta_7$ with respect to the normal 1127 at the rear surface of the base layer 101. Depending on geometry, second light waves such as light wave 1190 may not be incident on the first inclined portion 112 (also see FIG. 6 showing light waves not incident on the first inclined portion 112). These second light waves, in some embodiments, enter the second refractive layer 120, after refraction, at a small angle with respect to the direction 1131. In terms of the front-rear direction 1132 and passage of light through the second refractive layer 120, the second light waves have a larger angle than the light waves 1100 through the second refractive layer 120.

In the example of FIG. 11, the first refractive layer 110 is positioned in front of the base layer 101. The first refractive layer 110 includes a pattern and the pattern includes the first inclined portion 112, the parallel portion 114 and the second inclined portion 113. These portions each repeat in the pattern of the exemplary optical film 100 of FIG. 11; the pattern itself repeats in the direction 1131 (see, for example, FIG. 5).

The first inclined portion is oriented with an angle $\theta_4$ 1141 with respect to the direction 1131 (neglecting the +/− sense of direction 1131). The second inclined portion is oriented with an angle $\theta_5$ with respect to the direction 1131 (again neglecting the +/− sense of direction 1131). In some embodiments, $\theta_5 < \theta_4$.

After passage through the second refractive layer 120, light waves pass to the outside (in FIG. 11 see light wave 1196 at emission angle $\theta_6$, also, see, for example, FIGS. 5-6). In some embodiments, a front surface of the second refractive layer 120 extends in the direction 1131 and thus has a normal vector 1126 which is parallel to the direction 1132. A large emission angle $\theta_6$, in some embodiments, indicates that the light passing to the outside has a large angle with respect to the direction 1132 and thus with respect to normal 1126. For example, the emission angle may be an angle of $\theta_6=60$ degrees up to $\theta_6=90$ degrees. An emission angle of $\theta_6=90$ degrees indicates a light wave parallel to the direction 1131. A small emission angle $\theta_6$, in some embodiments, indicates that the light passing to the outside has a small angle with respect to the direction 1132, for example, an angle of $\theta_6=0$ degrees up to $\theta_6=30$ degrees. $\theta_6=0$ degrees corresponds to a light wave parallel to the direction 1132 and thus parallel to the normal 1126 at the front surface of the second refractive layer 120. Between these large and small angles, a medium emission angle $\theta_6$, in some embodiments, has values between $\theta_6=30$ degrees to $\theta_6=60$ degrees with respect to the direction 1132 and similarly with normal 1126.

As is apparent from the above description, the display apparatus may improve a viewing angle because the display apparatus includes an optical film having a refractive layer, in which an inclined portion configured to totally reflect some of incident light waves is formed.

The display apparatus may be configured to allow external light to be incident on a refractive layer having a relatively low refractive index and then to be moved to a refractive layer having a relatively high refractive index, and thus the display apparatus may prevent retro-reflection caused by total reflection and improve the contrast ratio.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
a backlight unit configured to emit a first plurality of light waves, wherein the first plurality of light waves includes a second plurality of light waves;
a display panel positioned in front of the backlight unit; and
an optical film positioned in front of the display panel, wherein the optical film comprises:
a base layer positioned adjacent to the display panel,
a first refractive layer positioned in front of the base layer, wherein the first refractive layer includes a pattern, wherein the pattern includes a first inclined portion, a second inclined portion, a third inclined portion and a fourth inclined portion, wherein the first inclined portion is configured to totally reflect the second plurality of light waves, the pattern is approximately symmetric with a center line extending in a front and a rear direction, the third inclined portion being symmetric about the center line to the second inclined portion, the second inclined portion, the third inclined portion forming a v-shape with a point of the v-shape toward the rear direction and an open portion of the v-shape toward the front direction and with the point of the v-shape closer to a rear-most surface of the first refractive layer than any other portion of the v-shape and wherein the first refractive layer is associated with a first refractive index, and
a second refractive layer positioned in front of the first refractive layer, wherein the second refractive layer is associated with a second refractive index, and wherein the second refractive index is less than the first refractive index.

2. The display apparatus of claim 1, wherein
the first inclined portion is oriented at a first angle with respect to a direction in which the first refractive layer extends, wherein the pattern includes the second inclined portion inclined at a second angle with respect to the direction in which the first refractive layer extends, and wherein the second angle is smaller than the first angle.

3. The display apparatus of claim 2, wherein
the second inclined portion is configured to refract the second plurality of light waves.

4. The display apparatus of claim 2, wherein
the optical film is configured such that, among light waves incident in a front-rear direction, the second plurality of light waves is emitted at a larger angle with respect to the front-rear direction than a third plurality of light waves is emitted, wherein the third plurality of light waves is emitted without having undergone total reflection by the first inclined portion, and wherein the first plurality of light waves includes the third plurality of light waves.

5. The display apparatus of claim 2, wherein the optical film is configured such that, among a fourth plurality of light waves obliquely incident with respect to a front-rear direction, light waves emitted after being refracted by the first inclined portion are emitted at a smaller angle with respect to the front-rear direction than light waves refracted by the second inclined portion, wherein the fourth plurality of light waves is included in the first plurality of light waves.

6. The display apparatus of claim 2, wherein the second refractive layer comprises a supplement portion positioned between abutting the second inclined portion.

7. The display apparatus of claim 1, wherein the pattern of the first refractive layer comprises a parallel portion extending in a direction in which the first refractive layer extends.

8. The display apparatus of claim 1, wherein the pattern of the first refractive layer is formed in an embossed pattern.

9. The display apparatus of claim 8, wherein the second refractive layer comprises a filling portion filling between the patterns of the first refractive layer.

10. The display apparatus of claim 1, further comprising: an adhesive layer positioned between the display panel and the optical film.

11. The display apparatus of claim 1, wherein the second plurality of light waves includes a fifth plurality of light waves incident in a front-rear direction.

12. The display apparatus of claim 1, wherein the display panel comprises a polarizing sheet, and wherein the base layer is positioned in front of the polarizing sheet.

13. A display apparatus comprising:
a display panel;
a backlight unit configured to supply light to the display panel and provided such that a portion of light emitted in a front and rear direction is greater than a portion of light emitted in an oblique direction with respect to the front and rear direction; and
an optical film positioned in front of the display panel, wherein the optical film comprises:
   a base layer positioned adjacent to the display panel,
   a first refractive layer positioned in front of the base layer configured to admit a plurality of light waves incident on a rear-most surface of the first refractive layer from the base layer, the plurality of light waves including first light waves incident at a first position of the rear-most surface of the first refractive layer and second light waves incident at a second position of the rear-most surface of the first refractive layer, wherein the first refractive layer includes a pattern formed in an embossed pattern, wherein the pattern includes a first inclined portion, a second inclined portion, a third inclined portion and a fourth inclined portion, wherein the first inclined portion is configured to totally reflect the first light waves passing through the base layer, wherein the second inclined portion is configured to refract the first light waves totally reflected by the first inclined portion, the pattern is approximately symmetric with a center line extending in the front and rear direction, the third inclined portion being symmetric about the center line to the second inclined portion, the second inclined portion, the third inclined portion forming a v-shape with a point of the v-shape toward the rear direction and an open portion of the v-shape toward the front direction and with the point of the v-shape closer to the rear-most surface of the first refractive layer than any other portion of the v-shape and wherein the first refractive layer is associated with a first refractive index, and
   a second refractive layer positioned in front of the first refractive layer, wherein the second refractive layer is associated with a second refractive index, and wherein the second refractive index is less than the first refractive index.

14. The display apparatus of claim 13, wherein the optical film is configured such that, among light waves incident in a front-rear direction, the first light waves are emitted at a larger angle with respect to the front-rear direction than the second light waves, the second light waves being emitted without having undergone total reflection by the first inclined portion.

15. The display apparatus of claim 13, wherein the plurality of light waves including third light waves, the third light waves being obliquely incident with respect to a front-rear direction,
the optical film is configured such that, among the third light waves, light waves emitted after being refracted by the first inclined portion are emitted at a smaller angle with respect to the front-rear direction than light waves refracted by the second inclined portion.

16. The display apparatus of claim 13, wherein the first refractive layer comprises a plurality of patterns, the plurality of patterns comprising the pattern and a second pattern, the second pattern being similar to the pattern,
the second refractive layer comprises a filling portion filling between the pattern and the second pattern of the first refractive layer.

17. The display apparatus of claim 13, further comprising: an adhesive layer positioned between the display panel and the optical film.

18. The display apparatus of claim 13, wherein the first inclined portion is oriented at a first angle with respect to a direction in which the first refractive layer extends, wherein the second inclined portion is oriented at a second angle with respect to the direction in which the first refractive layer extends, and wherein the first angle is greater than the second angle.

19. A display apparatus comprising:
a display panel comprising a polarizing sheet; and
an optical film positioned in front of the display panel, wherein the optical film comprises:
   a base layer positioned on the polarizing sheet,
   a first refractive layer positioned on the polarizing sheet, wherein the first refractive layer includes an embossed pattern, wherein the embossed pattern is configured to totally reflect some light waves incident in a front-rear direction among light waves passing through the base layer, wherein the embossed pattern includes a first inclined portion, a second inclined portion, a third inclined portion and a fourth inclined portion, the embossed pattern is approximately symmetric with a center line extending in a front and a rear direction, the third inclined portion being symmetric about the center line to the second inclined portion, the second inclined portion, the third inclined portion forming a v-shape with a point of the v-shape toward the rear direction and an open portion of the v-shape toward the front direction and with the point of the v-shape closer to a rear-most surface of the first refractive layer than any other portion of the v-shape and wherein the first refractive layer is associated with a first refractive index, and a second refractive layer positioned in front of the first refractive layer wherein the second refractive layer is associated with a second refractive index, and wherein the second refractive index is less than the first refractive index.

* * * * *